United States Patent [19]

Mason

[11] 4,069,156
[45] Jan. 17, 1978

[54] SEWAGE TREATMENT SYSTEM

[75] Inventor: Donald G. Mason, Overland Park, Kans.

[73] Assignee: Ecodyne Corporation, Chicago, Ill.

[21] Appl. No.: 485,899

[22] Filed: July 5, 1974

[51] Int. Cl.² ............................................. C02C 1/04
[52] U.S. Cl. ................................ 210/195 S; 210/256
[58] Field of Search ............... 210/11, 16, 17, 195 R, 210/195 S, 200–202, 205, 209, 256

[56] References Cited

U.S. PATENT DOCUMENTS

| | | | |
|---|---|---|---|
| 2,340,848 | 2/1944 | Reybold et al. | 210/256 X |
| 2,658,034 | 11/1953 | Hood | 210/17 X |
| 3,617,540 | 11/1971 | Bishop et al. | 210/16 |
| 3,709,364 | 1/1973 | Savage | 210/11 X |
| 3,713,543 | 1/1973 | Heaney | 210/256 X |
| 3,849,303 | 11/1974 | Torpey | 210/16 X |

*Primary Examiner*—Thomas G. Wyse
*Attorney, Agent, or Firm*—Hume, Clement, Brinks, Willian & Olds, Ltd.

[57] ABSTRACT

An improved apparatus for purifying a liquor containing biodegradable wastes wherein the liquor is delivered serially to a number of zones. The liquor is first delivered to a clarification zone to remove suspended solids, and is then delivered to an oxidation/nitrification zone where the liquor is subjected to oxidation by aerobic microorganisms. The liquor is next delivered to a denitrification zone, where it is subjected to the action of anaerobic bacteria. Both the oxidation/nitrification zone and the dentrification zone contain a particular type of submerged media which comprises a multiplicity of elements freely and randomly stacked on one another to provide interstitial area therebetween. The elements have a high surface area to volume ratio in order to promote the growth of microorganisms.

6 Claims, 3 Drawing Figures

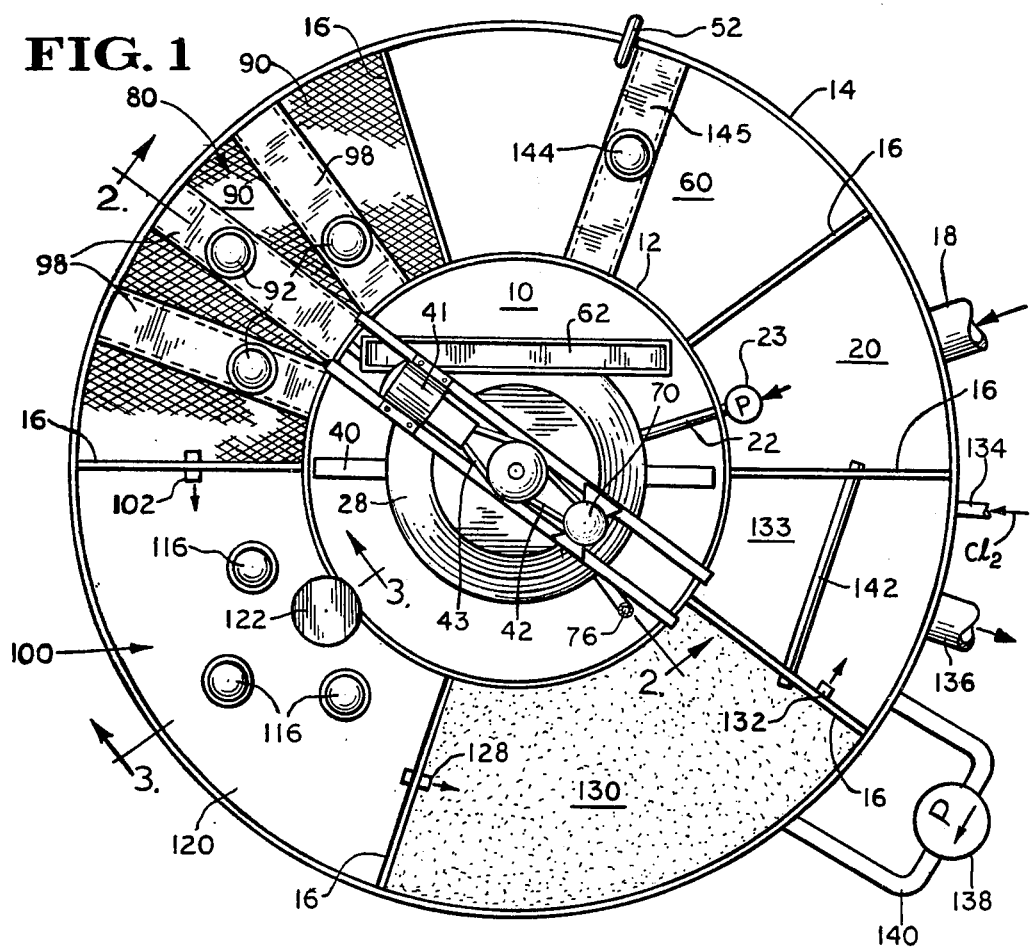
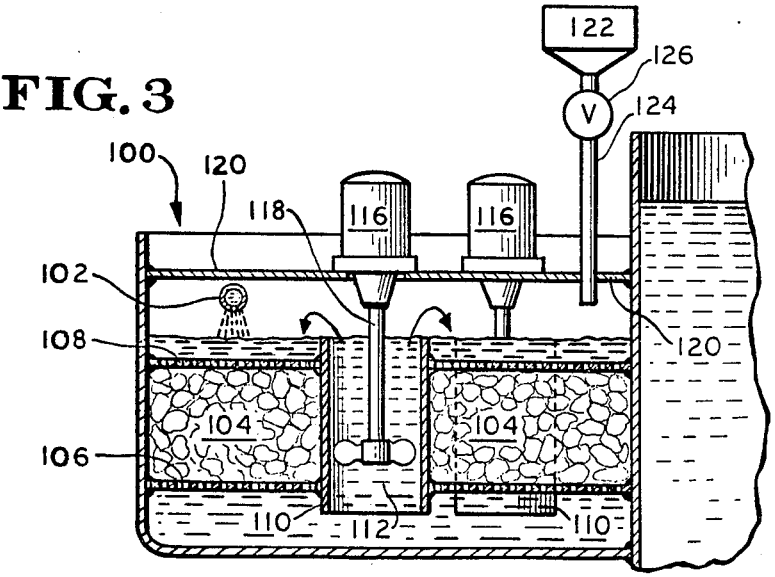

SEWAGE TREATMENT SYSTEM

The present invention relates to an improved apparatus for purifying a liquor containing biodegradable wastes.

A well known system for the treatment of liquor containing biodegradable wastes is the so-called "three-sludge system." In that system, the wastes are first subjected to the action of aerobic microorganisms (activated sludge) for the removal of carbonaceous materials, and then delivered to a sedimentation zone. The liquor is delivered from the sedimentation zone to a second activated sludge station where nitrification (primarily the aerobic conversion of ammonia to nitrates) is accomplished. The liquor goes through a second sedimentation zone, and is then delivered to a third activated sludge station where anaerobic denitrification (the removal of nitrates) is performed. The liquor is then delivered to a third sedimentation zone, and finally to a filter and chlorination station.

As can be seen from the foregoing, the "three-sludge system" requires three activated sludge stations together with three sedimentation zones so that such a system tends to be large and expensive, and is therefore adapted only to relatively large-scale installations.

There are also systems known as physical/chemical systems which can remove BOD and nutrients (nitrogen and phosphorous). These systems utilize a clarifier to remove suspended solids and BOD. This is followed by activated carbon absorption and ion exchange. The carbon removes the dissolved BOD while the ion exchange columns remove the nitrogen. This type of system is very expensive and again applicable only to large scale systems.

The present invention provides a method for purifying liquor containing biodegradable wastes which is more compact and less expensive than a conventional three-sludge system, while providing effluent of equal or higher quality. This system is adapted to both high capacity and low capacity installations.

Generally, in carrying out the method of the present invention, liquor containing biodegradable wastes is first delivered to a clarification zone, and is held in the clarification zone for a time period sufficient to permit suspended solids to settle to the bottom of the zone. The liquor is then delivered from the clarification zone to an oxidation/nitrification zone, where it is aerated and passed through a first bed of submerged media which comprises a multiplicity of elements freely and randomly stacked on one another to provide interstitial area between them. The elements have a high surface area to volume ratio in order to promote the growth of aerobic microorganisms on their surface.

The liquor is then delivered from the nitrification zone to a denitrification zone, where it is passed through a second bed of submerged media of the type described above. The liquor is not aerated in this zone because anaerobic microorganisms are desired. A carbon-containing nutrient is fed to the microorganisms to promote the anaerobic growth of the microorganisms on the media and to promote the digestion of materials contained in the liquor. The liquor can then be delivered from the denitrification zone to service, or may first be passed through filtration and/or chlorination zones before being delivered to service.

The invention also provides improved apparatus for purifying a liquor containing biodegradable materials in accordance with the foregoing method. Basically, the apparatus comprises means defining a multiplicity of zones including a clarification zone, an oxidation/nitrification zone, and a denitrification zone. Means are provided for delivering liquor to the clarification zone and from the clarification zone to the oxidation/nitrification zone. The oxidation/nitrification zone includes a first bed of media of the type described above. Aeration means are also provided in the oxidation/nitrification zone for introducing air into the liquor. Suitable means are provided for delivering the liquor through the first bed of media.

The denitrification zone contains a second bed of the above-described media, and means are provided for delivering the liquor through this second bed of media. Means are also provided for delivering the liquor from the oxidation/nitrification zone to the denitrification zone, and for introducing a nutrient into the second bed of media. Finally, the invention includes means for withdrawing treated liquor from the denitrification zone.

The invention, its construction and method of operation, together with the objects and advantages thereof, will be best understood by reference to the following detailed description, taken in conjunction with the drawings, in which:

FIG. 1 is a plan view of a preferred apparatus embodying the present invention:

FIG. 3 is a cross-sectional view taken along line 3—3 of FIG. 1.

Figure 2:
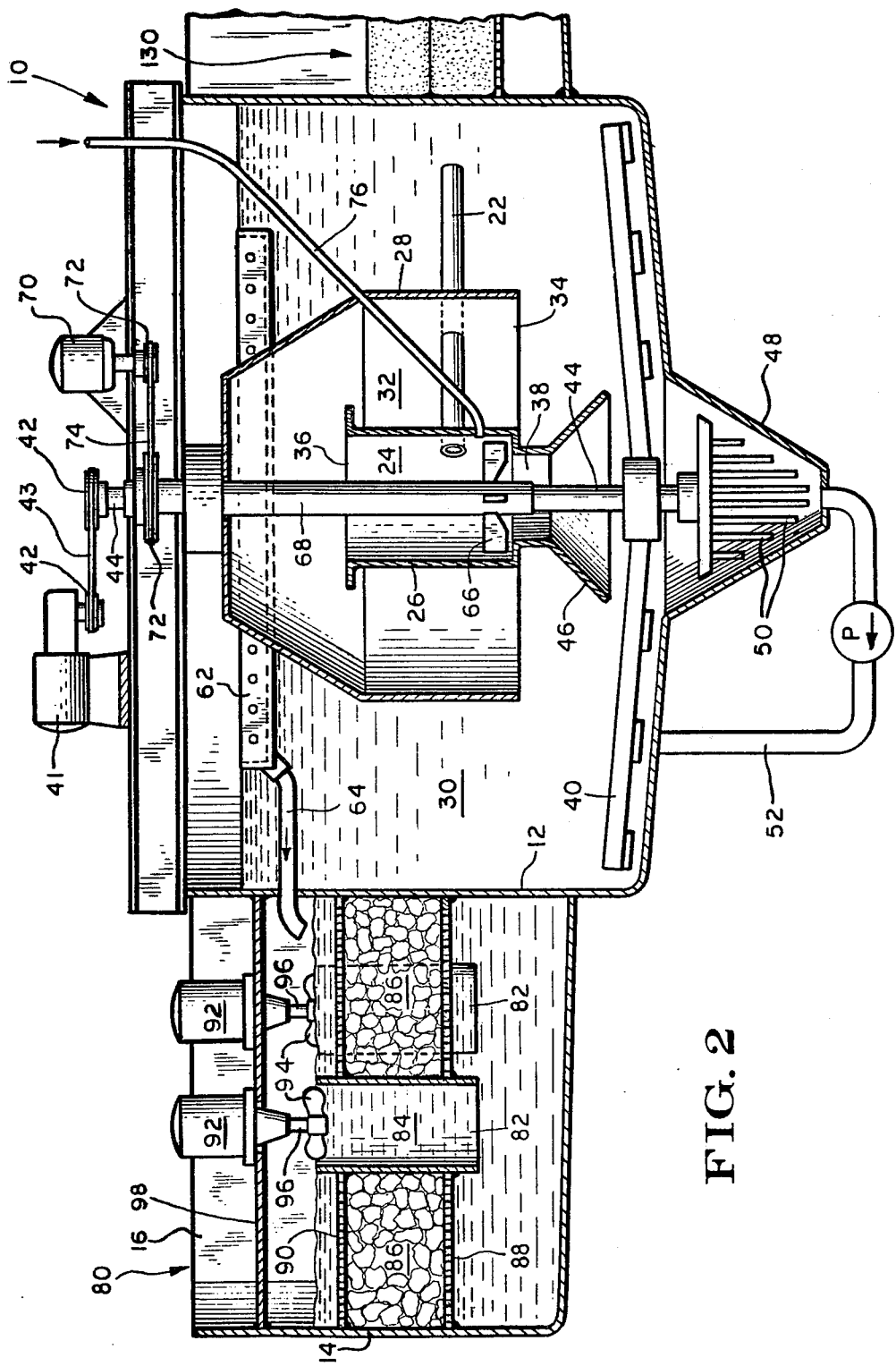
FIG. 2 is a cross-sectional view taken along line 2—2 of FIG. 1.

Referring to FIG. 1, a preferred apparatus embodying the invention comprises a central clarification zone, hereinafter referred to as a "clarifier" 10, having a generally cylindrical side wall 12. The side wall 12 is surrounded by a concentric cylindrical outer wall 14. The annular area between the clarifier side wall 12 and the outer wall 14 is divided into a series of chambers or zones by partitions 16.

Liquor containing biodegradable materials enters the apparatus through an inlet pipe 18, where it is delivered to a surge tank 20. Liquor is pumped from a lower portion of the surge tank 20 into the clarifier 10 through a pipe 22 by means of pump 23 as shown in FIG. 2.

In the embodiment shown, the clarifier 10 is of the general type shown and described in U.S. Pat. No. 3,397,788, which is assigned to the assignee of this application.

This liquor entering the clarifier 10 is delivered directly to the central uptake zone 24, defined by a generally cylindrical central member 26. The cylindrical central member 26 is surrounded by a partition member 28. The partition member 28 and the side wall 12 form a settling zone 30. The cylindrical central member 26 and the partition member 28 also form an annular mixing and recirculation chamber 32. The settling zone 30 communicates with the mixing and recirculation chamber 32 through a lower opening 34 in the partition member 28. The uptake zone 24 communicates at its upper opening 36 with the mixing and recirculation zone 32. The uptake zone 24 communicates with the lower portion of the settling zone 30 through an opening 38.

Mounted within the lower portion of the settling zone 30 is a scraper 40 which covers the entire bottom of the clarifier 10. The scraper 40 is driven by a motor 41, pulleys 42, and a drive belt 43 mounted on top of the clarifier 10 and connected to a shaft 44 which extends through the uptake zone 24, as shown in FIG. 2.

A hollow, inverted frusto-conical member 46 is attached to the lower portion of the central cylindrical member 26, and has upper and lower openings therein. The lower portion of the frusto-conical member 46 is directed toward a sludge pit 48, and the upper opening is directed toward the opening 38 in the bottom of the central uptake zone 24. Any recirculated precipitates will pass upwardly through the frusto-conical member 46 into the opening 38 in the bottom of the uptake zone 24.

The sludge pit 48 is positioned centrally in the bottom of the clarifier 10. Sludge pit thickeners 50 are rotatably driven through the shaft 44 by the motor 42 with the scraper 40. Sludge is removed from the sludge pit 48 through the sludge pit removal line 52 having a pump 54. The sludge pit removal line 52 communicates with a sludge digestion chamber 60 as indicated in FIG. 1.

The flow time through the clarifier 10 is sufficient to provide adequate holding time for the sedimentation of settleable solids. Liquor that has been treated is withdrawn via an annular-shaped collector trough 62 and outlet line 64.

As shown in FIG. 2, the lower portion of the central uptake zone 24 includes a four-bladed impeller 66 which is attached to a cylindrical shaft 68 surrounding the shaft 44 drives the scraper 40. The impeller shaft 68 is connected to a motor 70 through a pair of pulleys 72 and a drive belt 74. The impeller 66 produces a swirling action within the uptake zone 24 which aids in pumping the water upwardly through the zone 24. The impeller 66 also aids in the mixing of precipitation producing chemicals with the liquid in the central uptake zone. Such chemicals may be conveniently introduced through chemical line 76, and these chemicals are well known in the art.

Liquor that emerges from the clarifier 10 through the outlet line 64 will have most of the particulate material removed, and is now ready for the removal of the remaining dissolved and undissolved BOD (biological oxygen demand) and COD (chemical oxygen demand). To this end, the liquor is delivered through the outlet line 64 to an oxidation/nitrification zone 80 (see FIG. 1). The basic oxidation/nitrification process is well known in the art, and, in its most basic form, converts ammonia and other nitrogen compounds to nitrates. In the apparatus of the present invention, nitrification is accomplished on a bed of media in the oxidation/nitrification zone 10 which comprises a multiplicity of elements freely and randomly stacked on one another to provide interstitial area between them. The elements have a high surface area to volume ratio to promote the growth of aerobic microorganisms thereon. The oxidation/nitrification zone 80 contains three cylindrical members 82, positioned in a triangular pattern as indicated in FIG. 1. These cylindrical members define vertical flow passageways 84, each of which is surrounded by media 86. The media is supported on a perforated floor 88, and is covered by a perforated cover 90.

The media 86 may be any suitable material having a high ratio of void space to volume. Preferably, such material should have at least about 90% void volume to produce a high surface area to volume ratio and a low impedance to liquid flow. Such void volume may be measured by pouring the fixed media into water in a graduated cylinder and noting the volume of water displaced by a given volume of media. For example, if the fixed media were poured into water having a volume of one liter to a level even with the one liter volume level, one hundred ml of water would be displaced by fixed media having 90% void volume.

The media 86 should also have a surface which is receptive to microbial growth. By way of example, a plastic tower packing media composed of polypropylene "Flexirings" manufactured by the Koch Engineering Co., of Wichita, KS, have been found suitable. "Flexirings" with a five-eighths inch nominal size and having a surface area of 100 square feet per cubic foot have been found to be suitable for use in the present invention. 3½ inch Flexirings, providing 28 square feet of surface area per cubic foot, have also been effectively utilized. Other types of media, such as other types of tower packing media, may be employed in the present invention. For example, Rashig and Pall rings and Saddle (e.g., Berl) type packing may be used in the invention, as well as any other materials having a high surface area to volume ratio which are receptive to the surface growth of microorganisms. This media is randomly stacked within the oxidation/nitrification zone 80, and provides a large amount of surface area and interstitial area both within and between the packing media pieces. Thus, liquor flowing downwardly through the media 86 constantly divides and recombines in streams to provide constant homogeneous mixing and intimate association with the surface of the packing media so that highly efficient digestion is provided.

In the oxidation/nitrification zone, it is important that a source of air for the aerobic process be provided. To this end, as shown in FIG. 2, a mechanical surface aerator is employed having a motor 92 which drives an impeller 94 through a shaft 96. The impeller 94 has an appearance similar to a marine propeller, and is pitched to draw liquor upwardly through the vertical passageways 84, and to aerate and distribute the liquor over the top of the media 86. Other aeration means, such as an air pipe leading into the vertical passageways 84, or aerators of the types discussed in U.S. Pat. No. 3,704,868 and 3,801,075 (which are assigned to the assignee of this application) may be employed.

Referring to FIG. 3, from the oxidation/nitrification zone, the liquor travels directly to a denitrification zone 100 (see FIG. 1) through a small pipe or opening 102 in an upper portion of the partition 16 between the oxidation/nitrification zone 80 and the denitrification zone 100. The denitrification zone 100 is similar to the oxidation/nitrification zone 80, except that it is designed to support the growth of anaerobic rather than aerobic microorganisms. To this end, the denitrification zone 100 also contains media 104 supported on a perforated floor 106 and covered by a perforated cover 108. The denitrification zone 100 also has three cylindrical members 110 defining vertical passageways 112 within the media 104. Each vertical passageway has an impeller 114 driven by a motor 116 through a shaft 118. The impeller 114 is similar to the impeller 94 in the oxidation/nitrification zone, except that, in this instance, it is fully submerged in the liquor in the dentrification zone in order to prevent undesired aeration of the liquor. The motors 116 are supported on a suitable cover 120, which covers the entire zone 100.

In the denitrification zone, nitrates are reduced by microorganisms to form nitrogen, which may be vented to the atmosphere. However, such microorganisms normally require a suitable nutrient medium, generally an organic compound such as alcohol, in order to survive. The nutrient medium is conveniently delivered to the media 104 from a nutrient reservoir 122 through a pipe 124 having a valve 126.

From the denitrification zone, the liquor is delivered through a short pipe or opening 128 (see FIG. 1) to a filtration zone 130. A portion of the filtration zone is shown in FIG. 2. This is a conventional filter, which desirably has a bed consisting of a combination of materials, such as sand and anthracite, to filter any particulate material from the liquor. Finally, the liquor is delivered via a pipe or opening 132 to a chlorination zone 133 where a suitable chlorinating agent is delivered to the liquor through an inlet pipe 134. Suitable chlorinating agents are well known in the art. Finally, the chlorinated effluent is delivered out of the apparatus through an outlet pipe 136, as shown in FIG. 1.

Periodically, it is desirable to backwash the filter 130, and, to this end, a backwashing pump 138 with suitable piping 140 is provided to deliver liquid from the chlorination zone 133 to the underdrain compartment of the filter 130. Backwash liquid from the filter 130 is delivered to the surge tank 20 through a suitable pipe 142 for reprocessing in the clarifier 10.

The sludge digestion chamber 60, which has been previously mentioned, provides treatment for sludge collected in the clarifier 10. Such treatment is provided through conventional aerobic digestion, and the sludge digestion chamber preferably includes a mechanical surface aerator 144 mounted on a suitable support 145. Particularly suitable mechanical aerators are shown and described in U.S. Pat. Nos. 3,704,868 and 3,801,075 which are assigned to the assignee of this application.

In carrying out the method of the present invention with the apparatus shown, influent liquor is first delivered to the surge tank, indicated by reference numeral 20 in FIG. 1, and then to the clarifier 10, where the bulk of suspended solids are removed. The liquor is then delivered to the oxidation/nitrification zone, indicated by reference numeral 80 in FIG. 1, where chemical and biological oxygen demand are removed. Referring to FIG. 2, in the oxidation/nitrification zone, liquor flows downwardly through the media 86, and then upwardly through the vertical passageways 84, to be continuously recirculated through the media. The liquor is withdrawn after treatment at a level near the top of the liquid level, and is delivered to the denitrification zone, as shown in FIG. 3. There, the liquor is again passed repeatedly through the media 104 and upwardly through the vertical passageways 112. Finally, the liquor is delivered to a filter, shown by reference numeral 130 in FIG. 1. The filtered liquor is then delivered to a chlorination zone indicated by reference numeral 133 in FIG. 1, and is then removed from the apparatus through an effluent pipe 136.

By means described above, backwash water may be delivered from the chlorination zone 133 to the filter 130, and the backwash effluent is delivered to the surge tank 20.

Sludge extracted from the clarifier 10 is delivered to the sludge digestion zone 60, where it is subjected to aerobic digestion. The digested sludge is then subjected to conventional dewatering procedures and is disposed of.

It will be understood that the foregoing preferred embodiment of the present invention includes aspects that are not essential in all instances. For example, the apparatus can, in many instances, operate without a surge tank. Some surge capacity is provided by the clarifier 10 itself, and, if flow rates are sufficiently even, no surge tank is required. In addition, filtration and chlorination of the liquor subsequent to denitrification may not be essential. Very few particles will be contained in the liquor at this stage, and microorganisms will also be at a relatively low level. However, filtration and chlorination have been included primarily because they are required by many local codes. Finally, the digestion of the sludge produced in the clarifier 10 need not be provided in a single apparatus, as illustrated in FIG. 1. However, this is highly desirable, as it achieves a compact apparatus.

Although the method and apparatus of the present invention are primarily intended for the treatment of sewage, as those skilled in the art will appreciate, the apparatus is also applicable to the treatment of other liquors containing dissolved and undissolved BOD and COD.

Obviously, many modifications and variations of the invention as hereinbefore set forth will occur to those skilled in the art, and it is intended to cover in the appended claims all such modifications and variations as fall within the true spirit and scope of the invention.

I claim:

1. Improved apparatus for purifying a liquor containing a biodegradable material comprising: means defining a clarification zone; means for delivering said liquor to said clarification zone; means defining an oxidation/nitrification zone; a first bed of media in said oxidation/nitrification zone, said media comprising a multiplicity of submerged elements freely and randomly stacked on one another to provide interstitial area therebetween, said elements having a high surface area to volume ratio; aeration means in said oxidation/nitrification zone for introducing air into said liquor; means for delivering said liquor from said clarification zone to said oxidation/nitrification zone; means for delivering liquor through said first bed of media; means defining a denitrification zone; a second bed of said media in said denitrification zone; means for delivering said liquor through said second bed of media; means for delivering said liquor from said oxidation/nitrification zone to said denitrification zone; means for introducing a nutrient into said second bed of media; and means for withdrawing said liquor from said denitrification zone, said oxidation/nitrification zone, said denitrification zone, and said filter means being positioned around the perimeter of said clarification zone to form a single, compact unit.

2. The apparatus as defined in claim 1 further comprising filter means also positioned at the perimeter of said clarification zone and means for delivering said liquor from said denitrification zone to said filter means.

3. The apparatus as defined in claim 2 further comprising chlorination means also positioned at the perimeter of said clarification zone and means for delivering said liquor from said filter means to said chlorination means.

4. The apparatus as defined in claim 2 further comprising a surge tank also positioned at the perimeter of said clarification zone and means for delivering said liquor from said surge tank to said clarification zone.

5. The apparatus as defined in claim 2 further comprising means defining a sludge digestion zone; aeration means in said sludge digestion zone; and means for delivering sludge from a lower portion of said clarification zone to said sludge digestion zone, said oxidation/nitrification zone, said denitrification zone, said filter means, said surge tank, and said sludge digestion zone being positioned around the perimeter of said clarification zone.

6. Improved apparatus for purifying a liquor containing biodegradable material comprising: a surge tank; inlet means for delivering said liquor to said surge tank; a generally cylindrical tank defining a clarification zone; means for delivering said liquor from said surge tank to said clarification zone; means defining an oxidation/nitrification zone; a first bed of media in said oxidation/nitrification zone, said media comprising a multiplicity of submerged elements freely and randomly stacked on one another to provide interstitial area therebetween, said elements having a high surface area to volume ratio; aeration means in said oxidation/nitrification zone for introducing air into said liquor; means for delivering said liquor from said clarification zone to said oxidation/nitrification zone; means for delivering said liquor through said first bed of media; means defining a denitrification zone; means for delivering said liquor from said oxidation/nitrification zone to said denitrification zone; a second bed of said media in said denitrification zone; means for delivering said liquor through said second bed of media; means for introducing a nutrient into said second bed of media; means defining a filtration zone having a filter bed therein; means for delivering said liquor from said denitrification zone to said filtration zone; means for backwashing said filter bed with filtered liquid; means for delivering the effluent from said backwashing to said surge tank; means defining a chlorination zone; means for delivering said liquor that has passed through said filter bed to said chlorination zone; means for chlorinating said liquor in said chlorination zone; means defining a sludge digestion zone; and means for delivering sludge from a lower portion of said clarification zone to said sludge digestion zone; said surge tank, said oxidation/nitrification zone, said denitrification zone, said filtration zone, said chlorination zone, and said sludge digestion zone being positioned around the perimeter of said clarification zone to form a single, compact unit.

* * * * *